3,062,310
MOTOR VEHICLE SPEED CONTROL
MECHANISM
Claude B. McCathron, Milwaukee, Wis., Mark R. Rowe, Cincinnati, Ohio, and Harry C. Zeisloft, Brookfield, Wis., assignors to General Motors Corporation, Detroit, Mich., a corporation of Delaware
Filed Feb. 12, 1960, Ser. No. 8,302
3 Claims. (Cl. 180—82.1)

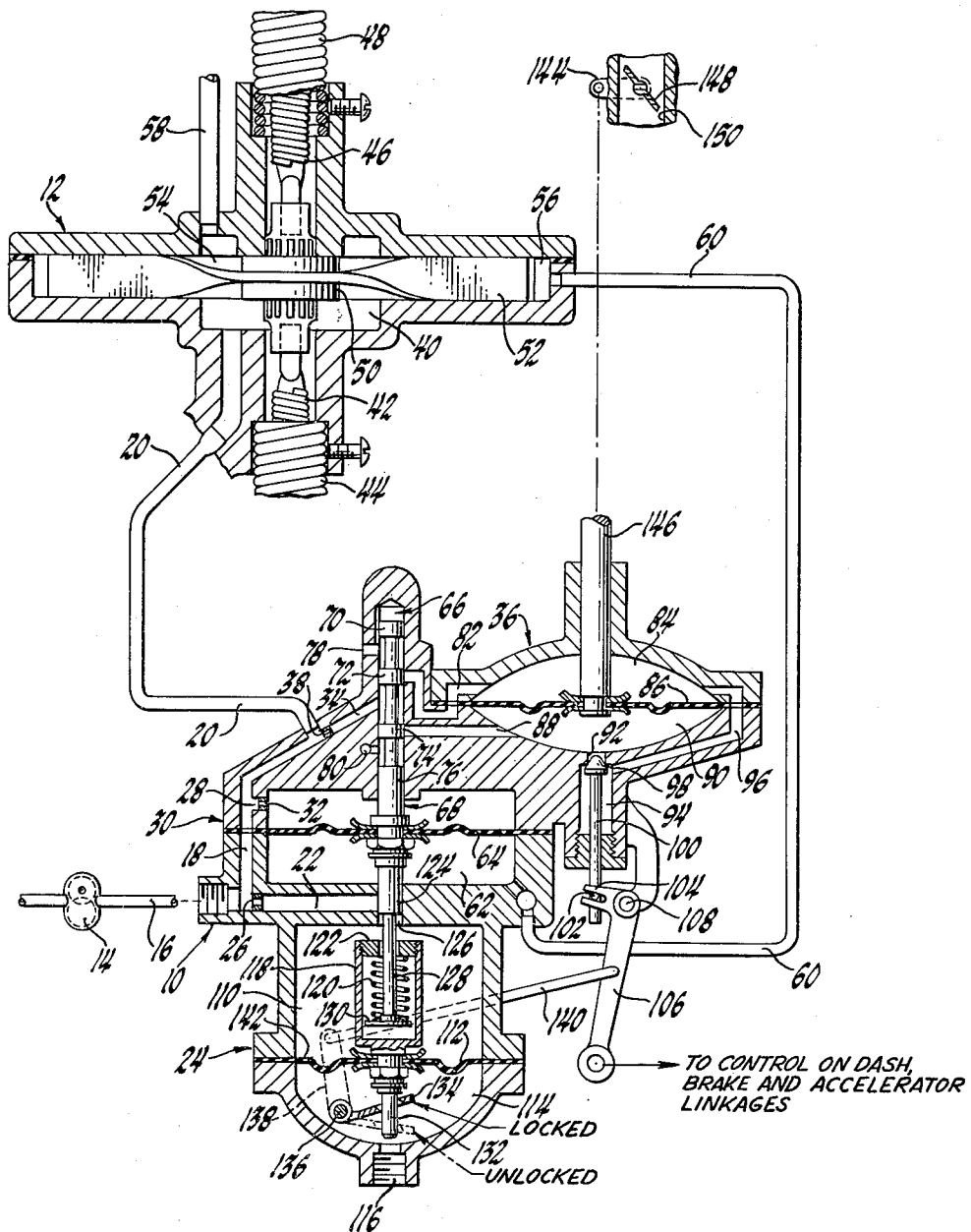

The invention relates to a mechanism for controlling the speed of a motor vehicle and more particularly to a fluid actuated mechanism which is sensitive to the road speed of the vehicle and is connected with the throttle linkage of the vehicle engine to adjust the throttle and maintain the desired vehicle road speed. The mechanism may be actuated by the vehicle operator to maintain a selected vehicle speed regardless of the terrain over which the vehicle is traveling. The mechanism is also connected with the vehicle braking linkage so that when the vehicle brakes are applied the mechanism is rendered inoperative and the vehicle throttle is permitted to return to the zero throttle position.

The speed of the vehicle is preferably transmitted to the mechanism by the standard speedometer drive cable. A fluid presure which is indicative of the vehicle speed is generated by a pump driven by the speedometer cable. The speed governor pressure thus generated controls a metering valve to provide control pressures which are impressed upon a servo mechanism connected to the throttle linkage. The position of the servo mechanism is thus controlled and the throttle is positioned in accordance with the vehicle speed. The desired vehicle speed is selected by the operator by first bringing the vehicle to the desired speed and then actuating the mechanism. The mechanism will then control the vehicle to maintain the speed thus set.

In the drawing, the FIGURE is a diagrammatic cross-section view of a mechanism embodying the invention.

The mechanism shown in the drawing is in the condition wherein the vehicle is running at a desired set speed with the mechanism controlling the throttle linkage to maintain that speed. The mechanism is contained within a housing having a control section 10 and a pump section 12. These sections may be comprised of various elements to provide a suitable housing for the various components of the mechanism. The engine oil pump 14 provides a power source for the mechanism. The oil pump outlet pressure fluid is conducted to the mechanism through the inlet conduit 16. Oil pump pressure fluid is delivered to the mechanism distribution passage 18 from inlet 16. A passage 20 connects distribution passage 18 with the speed sensitive pump contained in housing section 12. A fluid delivered through passage 20 is used to generate a fluid pressure indicative of vehicle speed.

A fluid passage 22 connects the distribution passage 18 with the speed positioning servo 24. A restriction 26 may be provided in passage 22 in order to assure a relatively constant pressure being delivered from distribution passage 18 and to prevent the pressure conditions in any one passage leading off passage 18 from affecting the pressure conditions in passage 22.

Passage 28 connects distribution passage 18 with one chamber of the valve control servo 30. Restriction 32 may be provided in passage 28 and perform the same function as does restriction 26 for passage 22. A control passage 34 connects distribution passage 18 with the control valve and provides control fluid to the throttle servo 36 in a manner to be described. A restriction 38 may also be provided in passage 34 and perform the same function as restrictions 26 and 32.

Referring now to the speed sensing portion of the mechanism, engine oil under pressure is transmitted from pump 14 through inlet 16 and passages 18 and 20 to speed pump inlet chamber 40. This chamber is formed in pump housing section 12. The speedometer drive cable is provided in two sections, with the section connecting the transmission output shaft including flexible drive cable 42 which is contained within cable housing 44. The other section of the speedometer drive cable includes flexible drive cable 46 and cable housing 48. The cable housings 44 and 48 are secured to pump housing 12 by any suitable means. The ends of cables 42 and 46 are in alignment and engagement with pump hub 50 so that cable 42 can rotatably drive the pump hub, and cable 46 is rotatably driven by the pump hub. Hub 50 is therefore driven at a speed which bears a direct relation to the vehicle road speed. The pump impeller 52 is fastened to the hub 50 so that it is also driven in direct relation to the vehicle road speed. The impeller rotates in pump chamber 54, and is preferably of the centrifugal type, so that the pump outlet pressure obtained in the outlet chamber 56 will be a function of vehicle speed. Any oil passing through the pump impeller and not pumped to outlet chamber 56 passes through pump chamber 54 and is transmitted to the engine oil reservoir through the exhaust passage 58.

Pump outlet chamber 56 is connected by passage 60 to the speed pressure chamber 62 of valve control servo 30. This chamber is formed by a portion of the housing control section 10 with one wall of the chamber being defined by the diaphragm 64 of the servo. The speed pressure delivered by the speed pump therefore acts on this diaphragm.

A valve chamber 66 is formed in housing control section 10 and a spool type control valve 68 is received within chamber 66. This valve is attached to diaphragm 64 and moves in chamber 66 as diaphragm 64 is actuated. The upper portion of valve 68 is formed to provide spaced lands 70, 72, 74, and 76 in the position shown in the drawing. Passage 34 connects to the portion of valve chamber 66 which is intermediate valve lands 72 and 74 when the valve is in the position shown. An exhaust passage 78 is formed in housing section 10 to connect the portion of valve chamber 66 intermediate lands 70 and 72 with the engine oil reservoir. Another exhaust passage 80 is formed in housing section 10 and connects valve chamber 66 to the engine oil reservoir at a point intermediate valve lands 74 and 76. Passage 82 in housing section 10 is positioned so that in the operating condition shown it is immediately opposite land 72 and is closed by that land. Passage 82 is open to exhaust passage 78 when valve 68 is moved downwardly from the position illustrated. It is opened to connect with control passage 34 and to receive fluid from that passage when valve 68 is moved upwardly from the position shown. Passage 82 leads to the throttle servo chamber 84 of servo 36. This chamber is defined by portions of housing section 10 with one wall being formed by servo diaphragm 86.

Control passage 88 is formed in housing section 10 opposite land 74 when the valve 68 is in the position illustrated. The passage 88 is shown as being closed by land 74. When valve 68 is moved downwardly from the position illustrated, passage 88 is connected with passage 34 and receives fluid under pressure from that passage. When valve 68 is moved upwardly from the position illustrated, passage 88 is connected to the engine oil reservoir through exhaust passage 80. Passage 88 connects to throttle servo chamber 90 of servo 36. This chamber is on the opposite side of diaphragm 86 from chamber 84 so that oil under pressure in the chamber acts in an opposite direction on diaphragm 86 from oil under pressure in chamber 84.

A passage 92 connects chamber 90 to a valve chamber 94 formed in housing section 10. Passage 96 connects chamber 84 with valve chamber 94. The end of passage 92 opening into chamber 94 provides a valve seat for valve 98. This valve is closed during all operative conditions of the control mechanism. Valve 98 has a valve stem 100 which extends through chamber 94 and is movable to seat valve 98 in the end of passage 92 when the mechanism is actuated. A pin 102 in the outer end of valve stem 100 is in engagement with a fork 104 of the bellcrank control arm 106. This arm is pivoted at 108 on a suitable bracket so that movement of the arm will result in the opening and closing of valve 98.

Control arm 106 is connected to linkage leading to a suitable control mechanism positioned so that it is convenient to operate by the vehicle driver. This linkage may be of any suitable nature and is not illustrated or described since the details thereof provide no part of the invention. The linkage may also be connected to the vehicle brake actuating linkage so that, when the brake pedal is depressed, control arm 106 will move counterclockwise to render the control mechanism inoperative. If desired, it may also be connected to the accelerator pedal so that the driver may render the mechanism inoperative to permit acceleration of the vehicle beyond the control speed. Such linkages are well known to those skilled in the art and any suitable configuration may be provided.

The speed positioning servo 24 is provided within housing section 10 so that passage 22 may deliver oil under pressure to the upper chamber 110 of the servo. This chamber is defined by walls formed from a portion of housing section 10 and a diaphragm 112 against which the oil pressure within the chamber is impressed for diaphragm movement. A lower chamber 114 is provided on the opposite side of diaphragm 112 from chamber 110. This chamber is open to exhaust by passage 116 so that when oil within the chamber is returned to the engine oil reservoir, the speed positioning and setting mechanism is contained within the chambers 110 and 114. This mechanism includes the diaphgram 112 and a spring retainer 118 which is attached to the center of diaphragm 112. The retainer is illustrated as being formed in a cup or cylinder configuration within which speed balancing spring 120 is received. The upwardly extending open end of spring retainer 118 is provided with a plug 122 which also provides a spring seat for spring 120.

The lower portion of valve 68 is provided with a land 124 extending through a passage 126 in the wall separating chambers 62 and 110. Passage 22 intersects passage 126 so that land 124 may control the flow of oil from passage 22 to chamber 110 in accordance with the position of valve 68. The reduced lower end 128 of valve 68 extends through an aperture in plug 122 and has a spring seat 130 attached to the end received within spring retainer 118. Spring 120 is thereby received intermediate spring seat 130 and plug 122 and reacts on these members.

The lower end of spring retainer 118 which extends through diaphragm 112 is formed as a rod 132 about which is positioned a locking arm 134. Arm 134 is apertured to receive rod 132 freely therethrough when the arm is in a plane substantially transverse to that of the rod. When the arm is cocked relative to rod 132 at a sufficient angle, however, it provides a positive lock which will prevent movement of rod 132 in either direction, thereby preventing movement of spring retainer 118. Locking arm 134 is moved to the locked and unlocked positions about pivot 136 by means of a suitable linkage such as links 138 and 140. Link 140 may be pivotally attached to control arm 106 so that when that arm is rotated clockwise into the operative position to close valve 98, the locking arm 134 will lock rod 132 and spring retainer 118 in the position they occupy at the time of actuation of the mechanism. In order to prevent a build-up of pressure in chamber 110 when passage 22 is open to passage 126, a bleed hole 142 is provided in diaphragm 112. Oil in limited quantity may pass from chamber 110 to chamber 114 through hole 142 and then into the engine oil reservoir through drain passage 116.

When the vehicle in which the control mechanism is installed is stopped, the control arm 106 is in the counterclockwise position so that valve 98 is open and rod 132 is unlocked. Oil pressure from pump 14 will be provided if the vehicle engine is running. All of the oil will be transmitted to the oil reservoir, however, through exhaust passages 58 and 116. When the vehicle is traveling on the road the speedometer drive cable 42 is rotating the pump impeller 52 so that a pressure is realized in pump outlet chamber 56 which is indicative of the speed of the vehicle. This pressure is transmitted through passage 60 to chamber 62 and acts against diaphragm 64 to move valve 68 in the upward direction. This valve movement permits oil to flow from passage 22 past land 124 into chamber 110 in metered quantities so that it acts on diaphragm 112 to position that diaphragm and spring retainer 118 in a position which reflects vehicle speed. At the same time oil from passage 34 passes between lands 72 and 74 into passage 82 and throttle servo chamber 84. Since valve 98 is open, however, this pressure is transmitted through passages 96 and 92 to chamber 90 so that the pressure is equalized on opposite sides of diaphragm 86. The excess oil goes through passage 88 and is returned to the engine oil reservoir through exhaust passage 80. Diaphragm 86 is therefore unloaded and is free to be positioned by the throttle linkage 144 which is normally controlled by the operator through the accelerator pedal. Rod 146 is connected to linkage 144 and diaphragm 86 so that it may be moved by that linkage to position diaphragm 86 in accordance with the accelerator pedal position when the control mechanism is inoperative. Thus the position of diaphragm 86 bears a true relationship to the position of the throttle valve 148 in the engine air inlet 150.

When the vehicle is running at a constant speed a balance will be obtained among the oil flows and pressures in the chambers of valve control servo 30 to position valve 68 in the null position illustrated. Servo diaphragm 86 and speed positioning servo 24 occupy positions reflecting the vehicle speed. When the operator desires to maintain a particular vehicle speed by means of the mechanism, he first brings the vehicle to that desired speed and maintains it a sufficient length of time to obtain the balance noted. This will be a relatively short time since the control mechanism is particularly sensitive to speed changes. When the operator has positioned the throttle valve 148 by the accelerator pedal in a position to maintain the desired speed, he actuates control arm 106 by the suitable linkage provided to close valve 98 and to lock rod 132 in the position which it occupies at the time of actuation. At this time a particular balance height of spring 120 has been established for the vehicle speed. This balance height is thus set for the desired speed. The valve 68 is positioned in the null position normally occupied under a balanced condition. Diaphragm 86 is hydraulically locked in the position in which it was placed by the linkage 144 at the time of closing valve 98.

So long as there is no change in engine torque load requirements, the vehicle engine will maintain the vehicle at the speed at which the control mechanism was actuated since the throttle valve 148 need not be moved. In practice it has been found, however, that this condition will normally exist on normal roads for only a relatively short period of time due to terrain as well as road surface conditions, variable weather conditions, etc. The torque or power demand placed upon the vehicle engine to maintain a constant vehicle speed is, therefore, almost continually changing. In order to supply the additional power demanded, or to decrease the required amount of engine power, throttle valve 148 must be continually repositioned by the control mechanism.

When the vehicle speed exceeds the desired speed, pump impeller 52 is driven at a slightly greater speed to increase the speed pressure in pump chamber 56. This increased pressure is transmitted through passage 60 to chamber 62 of servo 30. Since the pressure in the servo chamber on the other side of diaphragm 64 is provided through passage 28 and restriction 32, it is substantially constant. Therefore, the increased pressure in chamber 62 will move diaphragm 64 upwardly and valve 68 will move with it. An increase in control pressure will be imposed through passage 82 and into chamber 84. This increased pressure acts against diaphragm 86. At the same time the pressure within chamber 90 on the other side of diaphragm 86 has been decreased by permitting a portion of the oil within that chamber to be released to the engine oil reservoir through passage 88 and exhaust passage 80. The diaphragm 86 is therefore moved downwardly as illustrated in the drawing and acts through rod 146 and linkage 144 to move throttle valve 148 toward the closed throttle position to decrease engine power. Vehicle road speed will in turn be reduced as will the speed pressure in chamber 84 until the diaphragm 86 is again in a pressure balanced condition.

So long as the mechanism is actuated, the speed positioning pressure in chamber 110 has no effect on diaphragm 112 since that diaphragm is locked in position along with the spring retainer 118 to prevent movement of this portion of the control mechanism. Thus the forces exerted against spring 120 which tend to increase or decrease the length of that spring are exerted through spring seat 130 as valve 68 is moved up or down by diaphragm 64.

If the vehicle road speed tends to decrease, such as when going up a road grade, the speed pump will slow down slightly and will accordingly produce less speed control pressure in pump chamber 56. This will in turn reduce the pressure in chamber 62 acting on diaphragm 64. The force of spring 120 acting in the same direction as the pressure on the upper side of diaphragm 64 will then be sufficiently great to overcome the pressure in chamber 62 so that valve 68 is moved downwardly from the null position. This will cause a pressure drop in the control pressure existing in throttle servo chamber 84 since that chamber will be slightly opened to exhaust 78. At the same time the pressure will be increased in chamber 90 since passage 88 will be connected with pressure supply passage 34. Diaphragm 86 will therefore be moved upwardly to open the engine throttle valve and increase the engine speed. As the engine speed increases, vehicle road speed will increase, causing the speed pump to again rotate at a speed sufficient to maintain the proper balancing pressure acting on diaphragms 64 and 86 so that the valve 68 is again returned to the normal position and diaphragm 86 is hydraulically locked in the position required to hold that speed setting.

When it becomes necessary to deactivate the device, the operator may do so by rotating control arm 106 in the counterclockwise direction to open valve 98 and release rod 132. This may be accomplished manually from the dash control mechanism connected to arm 106. It may be accomplished by actuating the vehicle brake linkage which is also preferably connected to control arm 106 to rotate that arm in the counterclockwise direction upon application of the vehicle brakes. If it is desired to accelerate the vehicle beyond the set speed, the operator can move the accelerator pedal manually and the linkage connecting the accelerator pedal to control arm 106 will cause that arm to move in a counterclockwise position to de-energize the control mechanism.

A vehicle road speed mechanism has thus been provided which will not interfere with normal operation of the vehicle. When the operator desires to maintain the vehicle at a desired speed, he brings the vehicle to that speed and activates the control mechanism. The mechanism will then take over operation of the throttle linkage and will maintain the set vehicle speed so long as that speed can be maintained within the zero to full throttle limits of the throttle valve. Whenever the vehicle operator desires to regain manual control, he does so by either activating the brake or accelerator pedal or the control linkage for the mechanism by which the mechanism is activated. The entire mechanism is hydraulically operated, with the oil for operational power being provided by the engine oil pump. The mechanism may be readily installed on existing vehicles or may be provided as factory installed equipment.

What is claimed is:

1. A speed control mechanism for an automotive vehicle having an engine throttle, said mechanism comprising fluid servo means connected with said throttle, a first fluid pressure pump connected with said fluid servo means for actuation thereof by fluid pressure from said pump, vehicle speed responsive means including a second fluid pump for delivering fluid under a pressure reflective of vehicle speed, fluid pressure actuated means responsive to the output pressure of said second fluid pump, valve means selectively controlled by said fluid pressure actuated means for controlling fluid pressure from said first pump whereby fluid pressure acting on said servo means reflects vehicle speed, and means responsive to fluid pressure from said first pump for selectively activating said fluid pressure actuated means to control said valve means whereby said speed control mechanism is selectively operable to control vehicle speed.

2. A vehicle speed control mechanism comprising governor means responsive to vehicle speed, a throttle servo selectively fluid-connected with said governor means, a source of fluid pressure connected with and actuating said servo under influence of said governor means, manually controlled means for selectively connecting and disconnecting said throttle servo and said governor means, and source fluid pressure actuable means controlled by said manually controlled means for positioning said governor means at positions reflective of vehicle speed when said throttle servo and said governor means are disconnected and locked in position by said manually controlled means to establish the control vehicle speed when said throttle servo and said governor means are connected.

3. An automotive vehicle speed maintaining control system comprising, an engine throttle valve, first fluid servo means for actuating said throttle valve by moving the throttle valve toward the open and closed throttle positions, valve means for controlling pressure delivered to said first fluid servo means, second fluid servo means for actuating said valve means, a first fluid pressure pump for delivering fluid pressure to said valve means and to one side of said second fluid servo means, vehicle speed sensitive means including a second fluid pressure pump driven in accordance with vehicle speed, said second pump receiving fluid under pressure from said first pump and delivering fluid under an additional pressure reflective of vehicle speed to the other side of said second servo means, said valve means controlling fluid pressure delivery to one side of said first fluid servo means and fluid pressure exhaust from the other side thereof continuously throughout a range of fluid pressures and controlling fluid pressure delivery of said first pump to said second fluid servo means.

References Cited in the file of this patent
UNITED STATES PATENTS

| | | |
|---|---|---|
| 2,157,472 | Bellis | May 9, 1939 |
| 2,324,191 | Bowers | July 13, 1943 |
| 2,517,501 | Mennesson | Aug. 1, 1950 |
| 2,714,880 | Riley | Aug. 9, 1955 |
| 2,737,165 | Thorner | Mar. 6, 1956 |
| 2,916,100 | Teetor | Dec. 8, 1959 |
| 2,925,066 | Thorner | Feb. 16, 1960 |
| 2,966,224 | Teetor | Dec. 27, 1960 |
| 2,972,391 | Faiver et al. | Feb. 21, 1961 |